Oct. 4, 1966     J. A. GREEN     3,277,482
NAVIGATION OR POSITION LOCATING SYSTEM TRANSMITTING CARRIER
AND SIDE BAND WAVES SEPARATELY FROM SPACED RADIATORS
Filed Dec. 16, 1963
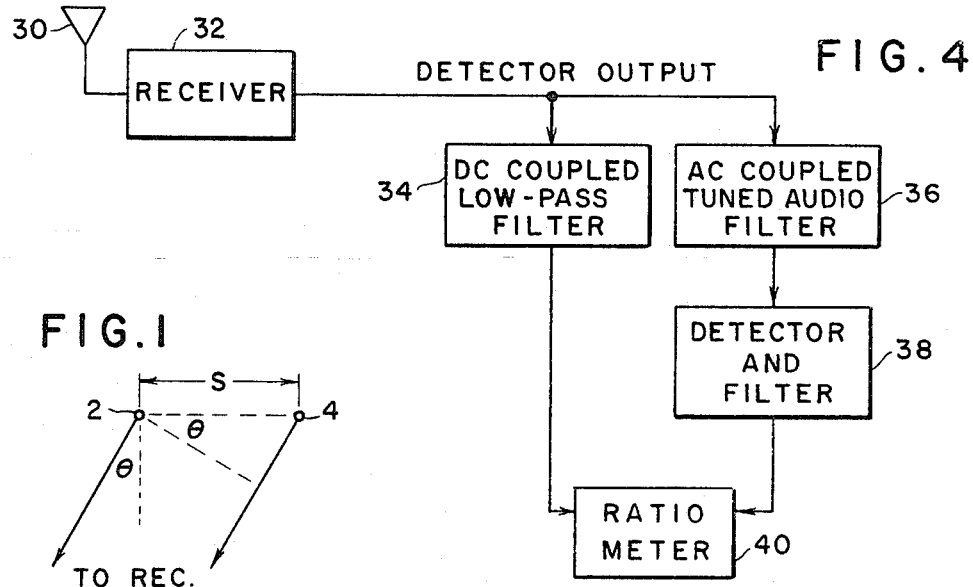
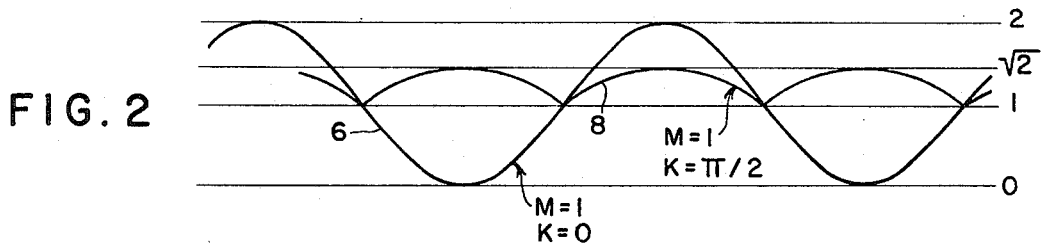
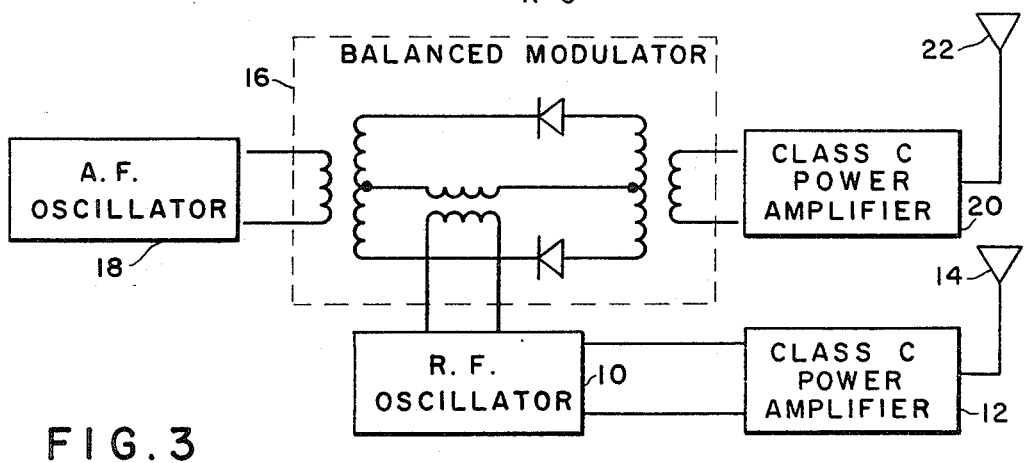
INVENTOR.
JOSEPH A. GREEN
BY Samuel J. Snyder
ATTORNEY

United States Patent Office 3,277,482
Patented Oct. 4, 1966

3,277,482
NAVIGATION OR POSITION LOCATING SYSTEM TRANSMITTING CARRIER AND SIDE BAND WAVES SEPARATELY FROM SPACED RADIATORS
Joseph A. Green, Adelphi, Md., assignor to ACF Industries Incorporated, New York, N.Y., a corporation of New Jersey
Filed Dec. 16, 1963, Ser. No. 330,953
6 Claims. (Cl. 343—102)

The invention relates to a navigation or position locating system of the hyperbolic type for determining the location of a receiver with respect to two or more radiators.

Hyperbolic navigation systems now in use measure the difference in time of arrival of signals transmitted from two or more synchronized stations in order to determine the location of a receiver. Such systems may be of the continuous wave or the pulse type, the most widely used Loran system being of the latter type. Such systems also are useful for missile guidance and other purposes, although they are herein called navigation systems for convenience. A principal drawback of hyperbolic navigation systems is the complexity of their receivers. Another requirement of such systems which increases their complexity is that the synchronized transmitters are spaced hundreds of miles apart, in order to provide time delay differences which are large enough to be readily measured.

An object of the present invention is to reduce the complexity of systems of the Loran type. This is done by providing a novel transmitting station and by rendering the system capable of measuring extremely small differences of time of travel and making the measurement simply by determining the depth of modulation of the signals, rather than measuring the phase difference of actual time delay between the signals from different transmitters. Since the system of the invention is sensitive to very small differences in time of travel, it permits relatively small spacings between the transmitter antennas.

The objects of the present invention are obtained by transmitting a carrier wave from one antenna and the modulation side bands of the carrier wave from another antenna spaced from the first one. The carrier and side band waves are then picked up by the receiver and the depth of modulation of the combined waves, which depends on the difference of the time of travel of the carrier wave and side band waves, is measured to determine the position of the receiver.

The invention will be fully understood and other objects and advantages thereof will become apparent from the following description and drawings in which:

FIG. 1 is a diagram representing the geometry of the system according to the invention;

FIG. 2 is a chart of wave forms obtained at the receiver;

FIG. 3 is a block diagram of the transmitter; and

FIG. 4 is a block diagram of the receiver.

According to the invention, a hyperbolic type navigational system is provided for locating the position of a receiver within receiving range of two fixed radiators 2 and 4, FIG. 1, one transmitting a carrier frequency $W$ and the other two side band frequencies $W+\Delta W$ and $W-\Delta W$, obtainable by means of a conventional suppressed carrier balanced modulator system. For any position of the receiver, except midway between the transmitters, there will be a difference in arrival time between signals from one transmitter and the other, and this will change the relative phase angle between the side band terms and the carrier, as well as the original percentage of amplitude modulation. From this a plot of isophase lines (hyperbolic sheets) can be drawn as in a Loran system.

If the two signals are mixed from the same source the resulting normalized wave would be:

$$(1+m \cos \Delta wt) \sin wt$$

where $m$ is the degree of modulation; and expanding this gives:

$$\sin wt + m \cos \Delta wt \sin wt$$

By spacing the transmitters relatively close together compared to the spacing between the receiver and the transmitters, the hyperbolic sheets lose their curvature for ordinary ranges and become approximately straight cones. The received rays can then be assumed to be parallel and the time delay between the arrival of one signal and the other will very nearly be $$\frac{S}{c} \sin \theta$$

The composite signal arriving at the receiver will then be $$\sin w\left(t+\frac{S}{c} \sin \theta\right)+m \cos \Delta wt \sin wt$$

where $c$=velocity of propagation and $\theta$=arrival angle measured from the normal to the line joining the transmitters.

Since there is no necessity for an absolute time scale, initial conditions can be chosen for simplification. Expanding the first term of the last expression and substituting $K$ for $$w\frac{S}{c} \sin \theta$$

there is obtained $$(\cos K + m \cos\ wt) \sin wt + \sin K \cos wt$$

The last expression represents two vectors in quadrature rotating in the complex plane at an angular frequency $W$ with amplitudes $$\cos K + M \cos \Delta wt \text{ and } \sin K$$

Replacing these two vectors with their resultant, its projection on the real axis becomes $$[1+M^2 \cos^2 \Delta wt + 2M \cos \Delta wt \cos K]^{1/2} \times \left[\sin wt + \arctan \frac{\sin K}{\cos K + M \cos \Delta wt}\right]$$

The first factor represents the amplitude modulation of the carrier as a function of $K$ while the phase term in the second factor shows how the phase of the carrier is modulated as a function of $K$.

FIG. 2 shows wave forms representing the amplitude of the first term of the last expression. Curve 6 of FIG. 2 is a graph of the amplitude term when $M=1$ and $K=0$, that is when the amplitude modulation factor at the transmitter is 100 percent and the relative time delay of the carrier and side bands is zero. The graph is essentially a sine curve having a peak amplitude equal to one. Curve 8 shows a graph of another condition, where again $M=1$, but the time delay is given by $$K=\frac{\pi}{2}$$

It can be seen that curve 8 has a very small depth of modulation. In general the depth of modulation will vary with the time delay, or the value of $K$, between the maximum value of curve 6, to the minimum value of curve 8.

Referring now to FIG. 3, a carrier oscillator 10 is connected through a power amplifier 12, preferably of the class C type, to a radiator 14. Another output of oscillator 10 is supplied to balanced modulator 16, wherein it is combined with the signals from a low or audio frequency oscillator 18. The balanced modulator 16 may be, of course, of any type and is herein represented in simple schematic form. The amplitudes of the outputs of oscillators 10 and 18 are adjusted to give a desired modulation factor M, such as $M=1$. The balanced modulator suppresses the carrier wave and produces a pair of side bands. The side bands of the carrier, after being amplified in power amplifier 20, are impressed on radiator 22. Radiators 14, 22 are spaced apart a distance corresponding to several wave lengths usually. If it is desired to eliminate any ambiguity in the determination of the position as a function of the measured depth of modulation, radiators 14, 22 are spaced apart less than ¼ of a wave length. In the usual radio system, radiators 14, 22 are suitable antennas. This system is obviously utilizable for acoustic wave propagation, in which case the radiators are electro-acoustic transducers.

At the receiving station the carrier and side band waves are collected by an antenna (or electro-acoustic transducer) 30 and fed to a receiver 32 having an amplitude modulation detector. To the output of the receiver, apparatus is connected to determine the depth of modulation of the signals. The modulation depth measuring apparatus shown in FIG. 4 includes a D.C. coupled low pass filter 34, and an A.C. coupled audio frequency filter 36. These filters are connected in parallel to the output of receiver 32. The output of filter 36 is fed through another detector or rectifier and filter 38 to a ratio meter 40 which measures the ratio of the A.C. to the D.C. component of the output of receiver 32, and thereby determines the modulation depth of the received signals. The ratio meter, of course, includes a suitable indicator for giving the reading of the modulation depth. The measured modulation depth determines a curve on which the receiver is located. Another fix may be taken on another transmitting station to determine another curve on which the receiver is located. Then, as in conventional hyperbolic navigation systems, the intersection of the two curves is determined to give the location of the receiver.

It will be evident to those skilled in the art to which the invention belongs that a number of modifications and variations of the disclosed embodiment of the invention may be made without departing from the principles of the invention, which is defined in the following claims.

What is claimed is:

1. A position locating system comprising; a transmitter having means for generating carrier waves and side band waves, a pair of laterally spaced radiators, one of said radiators being connected to said transmitter for transmitting only the carrier waves and the other radiator being connected to said transmitter for transmitting the side band waves, a receiver for receiving the radiated carrier and side band waves, and means connected to the output of the receiver for measuring the depth of modulation of the carrier waves by the side band waves for determining the position of the receiver relative to the transmitter.

2. A system according to claim 1, wherein the transmitter includes a radio frequency oscillator connected to one of said radiators, a balanced modulator connected to said oscillator, a low frequency oscillator connected to said balanced modulator, and means connecting the output of the balanced modulator to the other radiator.

3. A system according to claim 1, wherein said transmitter and receiver are a radio transmitter and radio receiver and said radiators are radio antennas.

4. A system according to claim 1, wherein said radiators are acoustic radiators and said receiver is an acoustic receiver.

5. A system according to claim 1, wherein the receiver includes an amplitude modulation detector and the means for measuring the depth of modulation includes means for deriving the D.C. and A.C. components of the output of the detector separately, and means for measuring the ratio of the amplitudes of these components.

6. A position determining system comprising a transmitter having means for generating carrier waves and amplitude modulation side band waves of said carrier waves, two fixed laterally spaced antennas, means connecting one of said antennas to the transmitter for radiating only the carrier waves and means connecting said other antenna to the transmitter for radiating the side band waves, a receiver having an antenna connected thereto for receiving the carrier and side band waves and means for measuring the degree of modulation of the carrier waves by the side band waves in the receiver.

References Cited by the Examiner

UNITED STATES PATENTS

| | | | |
|---|---|---|---|
| 2,373,090 | 4/1945 | Alford | 343—108 |
| 2,379,442 | 7/1945 | Kandoian | 343—108 |
| 3,181,159 | 4/1965 | Kramar et al. | 343—106 |

CHESTER L. JUSTUS, *Primary Examiner.*

LEWIS H. MYERS, *Examiner.*

H. C. WAMSLEY, *Assistant Examiner.*

UNITED STATES PATENT OFFICE
CERTIFICATE OF CORRECTION

Patent No. 3,277,482                      October 4, 1966

Joseph A. Green

It is hereby certified that error appears in the above numbered patent requiring correction and that the said Letters Patent should read as corrected below.

In the heading to the printed specification, lines 6, 7 and 8, for "assignor to ACF Industries Incorporated, New York, N. Y., a corporation of New Jersey" read -- assignor, by mesne assignment, to International Telephone and Telegraph Corporation, New York, N. Y., a corporation of Maryland --.

Signed and sealed this 29th day of August 1967.

(SEAL)
Attest:

ERNEST W. SWIDER                      EDWARD J. BRENNER
Attesting Officer                      Commissioner of Patents